United States Patent [19]
Lotz

[11] Patent Number: 6,086,423
[45] Date of Patent: Jul. 11, 2000

[54] READER DEVICE FOR CHIP CARDS

[75] Inventor: Reinhard Lotz, Erzhausen, Germany

[73] Assignee: Thomas & Betts International, Inc., Sparks, Nev.

[21] Appl. No.: 09/101,171

[22] PCT Filed: Nov. 4, 1997

[86] PCT No.: PCT/EP97/06092

§ 371 Date: Sep. 2, 1998

§ 102(e) Date: Sep. 2, 1998

[87] PCT Pub. No.: WO98/20441

PCT Pub. Date: May 14, 1998

[30] Foreign Application Priority Data

Nov. 5, 1996 [DE] Germany .......................... 196 45 460

[51] Int. Cl.[7] ................................................ H01R 24/00
[52] U.S. Cl. ...................................... 439/630; 439/928.1
[58] Field of Search ................................. 439/630, 928.1; 235/475, 479, 486, 441

[56] References Cited

U.S. PATENT DOCUMENTS

| | | | |
|---|---|---|---|
| 4,350,448 | 9/1982 | Hanagata | 400/120 |
| 4,904,852 | 2/1990 | Mita et al. | 235/479 |
| 5,600,539 | 2/1997 | Heys | 439/928.1 |
| 5,648,651 | 7/1997 | Inoue | 235/475 |
| 5,655,917 | 8/1997 | Kaneshige | 439/928.1 |

FOREIGN PATENT DOCUMENTS

| | | |
|---|---|---|
| 0 715 272 A2 | 6/1996 | European Pat. Off. . |
| 0 715 272 A3 | 1/1998 | European Pat. Off. . |
| A1 0316 699 | 5/1989 | France . |
| 195 02 176 A1 | 8/1996 | Germany . |

*Primary Examiner*—Lincoln Donovan
*Assistant Examiner*—Javaid Nasri
*Attorney, Agent, or Firm*—Hoffmann & Baron LLP

[57] ABSTRACT

Read apparatus for chip cards with a housing formed in two parts from a lower part (1) and an upper part (2), the upper part (2) of which contains a contact support (3), with a number of contact pairs (4) that corresponds to the number of read tracks and can be connected to a respective contact lead-in via a limit switch (20), wherein the upper frame part (1) and the lower frame part (2) enclose an insertion slot for the chip card, in which the lower frame part (1) is constructed as a slide guided so as to be displaced on the upper frame part (2) between two engaged positions, of which one engaged position defines the insertion or removal position and the other engaged position defines the read position for the chip card. The upper frame part (2) is equipped with a guide (7) and the lower frame part (1) with a carriage (8) that can be displaced on the guide (7) and pivoted out elastically over part of its length, the elastically pivotable area having a catch tab (9) which interacts with catches (10,11) formed in the upper frame part (2) corresponding to the two end positions of the slide (1). The upper part (2) is provided at one of its edges with hooks (21) permitting the encompassing of a support, a circuit board, for instance, and with elastic elements (22) in the vicinity, as well as with a spreader clips (24) in an area remote from the edge that can be inserted into an opening of the support.

14 Claims, 3 Drawing Sheets

READER DEVICE FOR CHIP CARDS

BACKGROUND OF THE INVENTION

The invention proceeds from a Chip card reading apparatus according to the preamble of claim 1. In the known chip card readings of this type, actuation is accomplished in that the chip card is inserted into the slide and inserted with it, possibly against the force of a spring being tensioned, until reaching a final position defined by a stop, in which the card, with simultaneous operation of a limit switch, is brought into it read position and held in place there. Removal takes place by a reverse process by releasing the lock holding the card in its final position, whereupon it is automatically ejected under the force of the tensioned spring. In these apparatuses, employed, for instance, for protection against or prevention of theft of automobile radios, the slide generally consists of transparent material, the slide being provided with a signal unit, for instance, a light-emitting diode shining on the slide, which becomes effective in the extended position.

The known chip card readings have proven themselves well in practice, but in many cases have a constructive height making their use difficult or occasionally, even ruling it out.

SUMMARY OF THE INVENTION

The objective of the present invention is accordingly the creation of a chip card reading apparatus permitting the exertion of an optical signal effect and which make economical production possible. This problem is solved by a Chip card reading apparatus with the characteristics reproduced in claim 1.

With the invention, a chip card reading apparatus is created in which the lower part, generally serving as the housing lid, simultaneously serves as the slide permitting the introduction of the chip card and which can be constructed in this way with an extraordinary small constructive height. Beyond that the frame is of simple design and can therefore be economically manufactured, in view of the fact that it consists of only two parts that con be connected by simply pushing them together, and also in view of the fact that the housing consists of different materials because of the transparency of the slide. It therefore permits a selection of materials optimally adapted to the other requirements, for instance, the required guidance characteristics.

BRIEF DESCRIPTION OF THE DRAWING FIGURES

Additionally details of the invention characterized in the claims are explained below on the basis of the attached drawings. These show, in FIG. 1, the perspective representation of a contact support frame in the inactive position;

FIG. 2, the housing reproduced in FIG. 1 in the read position;

FIG. 3, a view from below onto the housing reproduced in FIG. 1;

FIG. 4, a view of another embodiment of a contact support frame; and

FIG. 5, a view from the side onto FIG. 4.

DETAILED DESCRIPTION OF THE PREFERRED EMBODIMENTS

Figure 2:
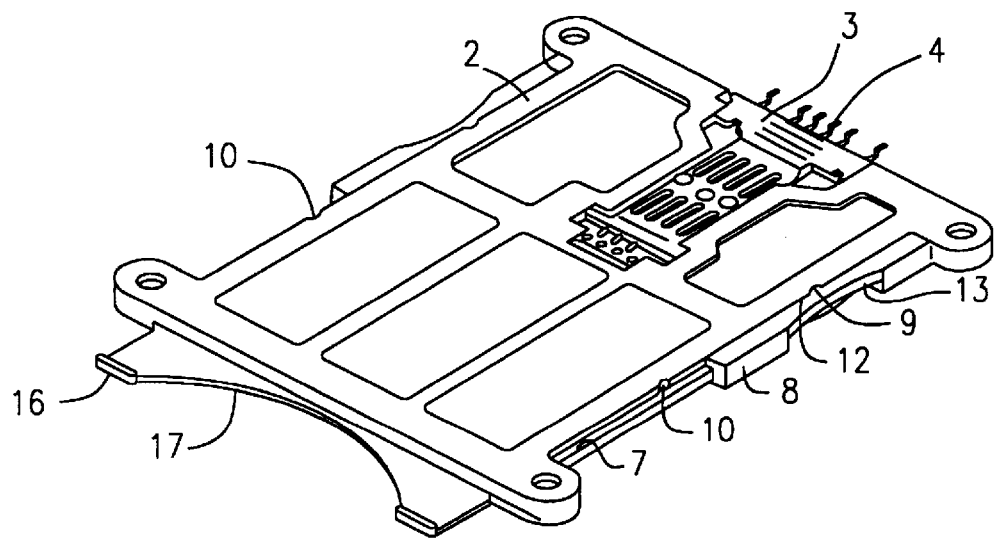
Figure 3:
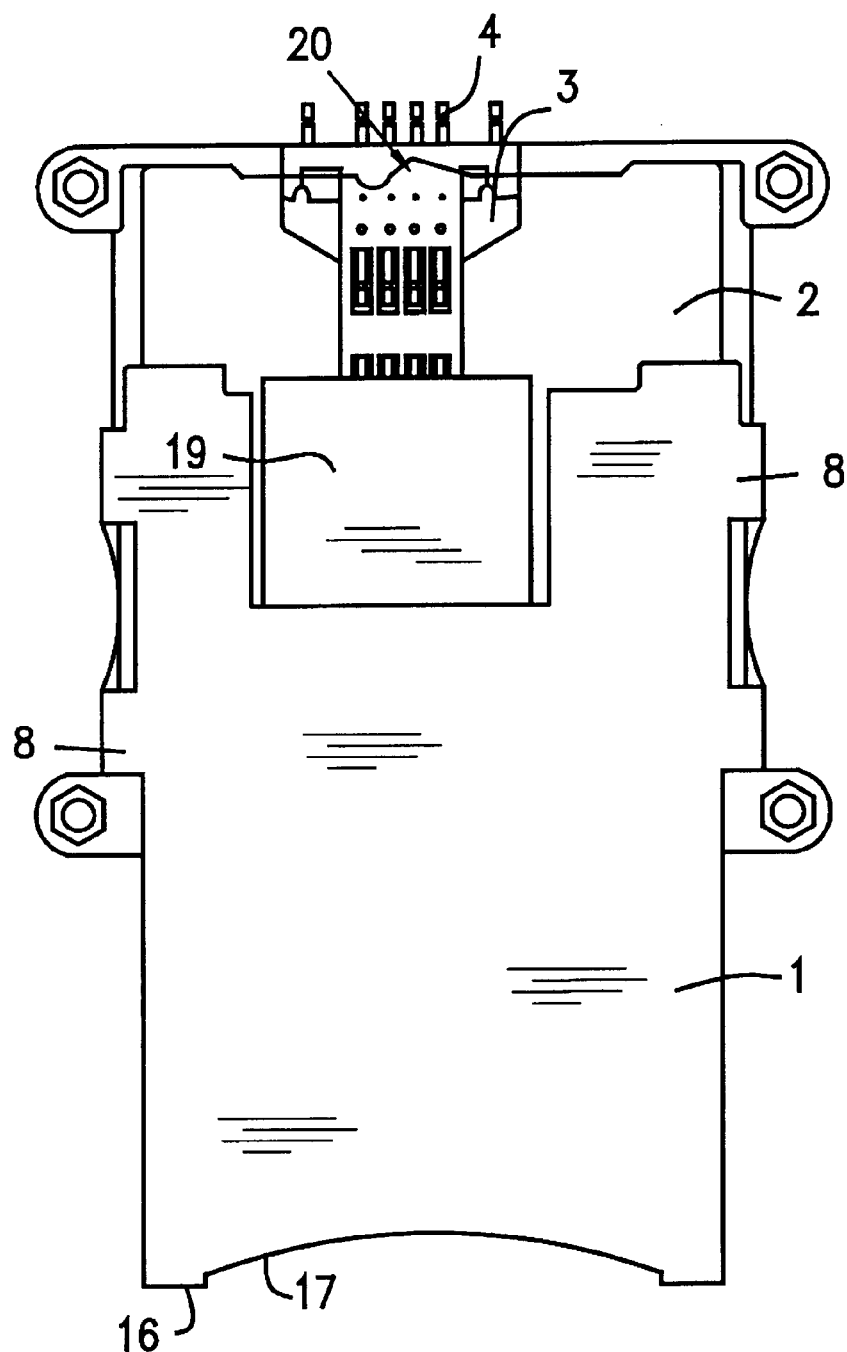

The chip card reading apparatus reproduced in FIGS. 1-3 consists of a housing constructed in two parts having a lower part 1 (hereinafter slide 1) and an upper part 23 intended for attachment to a circuit board. In case of this embodiment, the contacts 4 are clipped into the upper housing part together with the (3) contact support and are thus an integral component of the upper housing part 2. The contacts 4 are each connected via a limit switch 20 to a contact lead, not shown in the drawing. The lower frame part 1 is constructed as a slide that permits the introduction of the chip card into the apparatus and is guided on the upper frame part 2 such that it can be displaced between two engaged positions, of which one engaged position defines the insertion or removal position and the other engaged position the read position for the chip card.

For this purpose, the upper frame part 2 is provided on each side with a rail 7 as a guide and the lower frame part 1 with a carriage 8 in the form of a grooved bar encompassing the guide rail 7, opening in its middle area like a window and, because of its window like opening 13, forming an elastic ridge 123, on which a catch tab 9 is formed. Two catches 10 and 11 are formed in the upper frame par 2, the catch 10 defining the outer limit position of the slide corresponding to the loading position and the catch 11 the inner limit position corresponding to the read position.

The upper housing part 2 is provided with stops 5 which prevent a displacement of the carriage 1 past its engaged positions 9/10, 9/11 and, in order to make the joining of the two parts easier, are constructed to be flexible about the longitudinal axis extending parallel to the guide rails 7. The stops 5 are provided with drilled holes which permit the screwing of the upper housing part to a support, for instance, a circuit board. Because of this construction of the Chip card reading device loosening of the slide 1 from its support is out of the question and thus an absolutely secure connection of the two parts in the installed position is guaranteed in that the screw fastening prevents the bending of the upper housing part, be a transverse tensile force on the slide, for instance, and thus a popping of the carriage of its guides. Such a stress leads instead to pull in the carriage 8 more tightly onto its guides.

The slide 1 is furthermore provided at the ends of its outer edges with entrainment stops 16 for the chip card and with a grip recess 17 for holding the chip card in the area between the entrainment stops 16.

Figure 1:
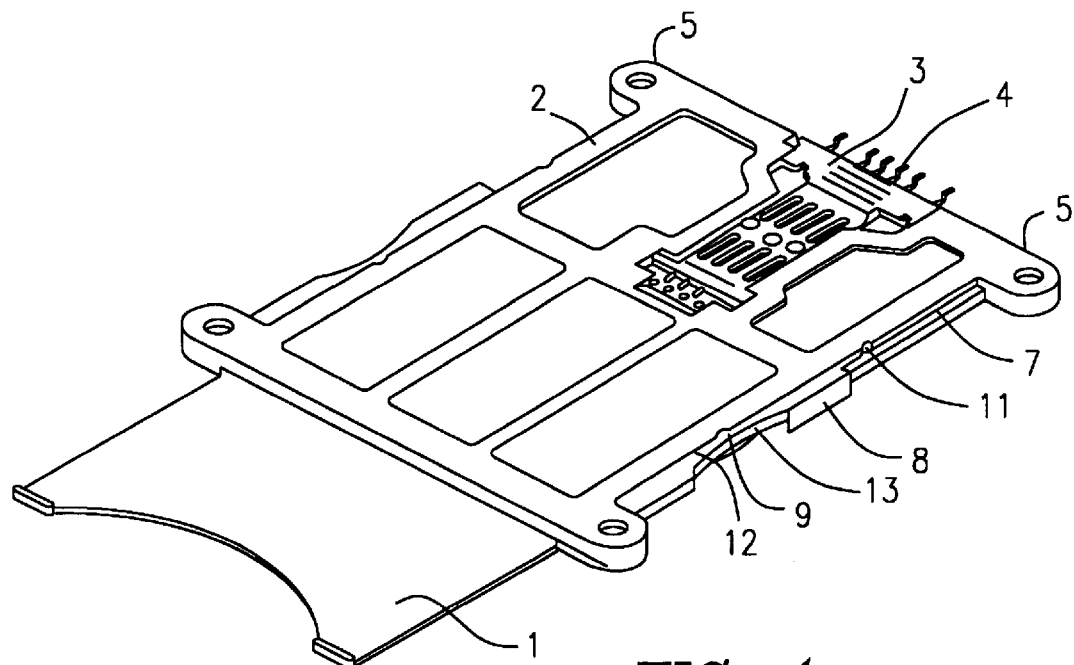

In order to push the chip card into the read position, the card is inserted into the slide 1 in the position of the reader reproduced in FIG. 1 and pushed with a slight pressure into the reader. Here the catch tabs 9 slide out of their catches 10 with an elastic outwards bending of the ridges 12 and slide 1 on the respective associated side surface of the upper frame part 2 until engaging in the catches 11 defining the read position. The extraction of the chip card correspondingly takes place in the reverse order, wherein the card can be easily gripped because of the grip recess 17 and entrains the slide 1 during extraction due to contact with the entrainment stops 16. From the drawing, in conjunction with the above explanation, it is immediately recognizable that the insertion of the slide 1 containing the chip card into the read position and its return to the removal position is done exclusively by manual operations and only against the transverse force exerted by the elastic ridges 12 causing a frictional force, the ridges 12 exerting no force on the card.

In the embodiment is reproduced in the drawings, the slide 1 is equipped at its inner edge with an actuation element 19 acting on the limit switch 20 projecting into the chip card plane and capable of pivoting out upon insertion of the chip card, in the case of this example, a tearout formed in one piece with the slide which bends out elastically into the slide plane upon insertion or introduction of the chip card into the slider 1. Any other device actuating the limit switch 20 under the specified condition can also be provided. On the one hand, the actuation element arranged in this manner exerts a pressure on the chip card and thus holds the contact field of the chip firmly against the contact in the read position of the contact field of the chip. On the other hand, the unit is of great advantage for Chip card readings in which, as is frequently the case in automobile radio equipment, a signal unit that indicates the non-functionality of the Chip card reading visually or acoustically is turned on by extraction of the chip card. In these cases the signal unit can be made inoperative by simply pressing the slide constructed in this manner, without involving putting the controlled device, the radio equipment, for instance, into operation. In known Chip card readings this is possible only by inserting a dummy card.

Figure 4:
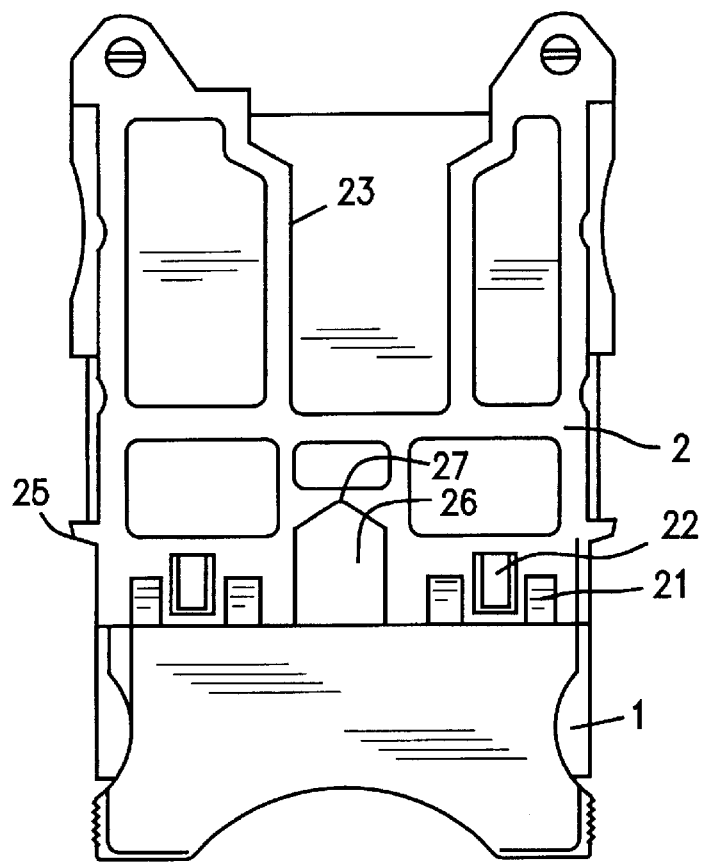
Figure 5:
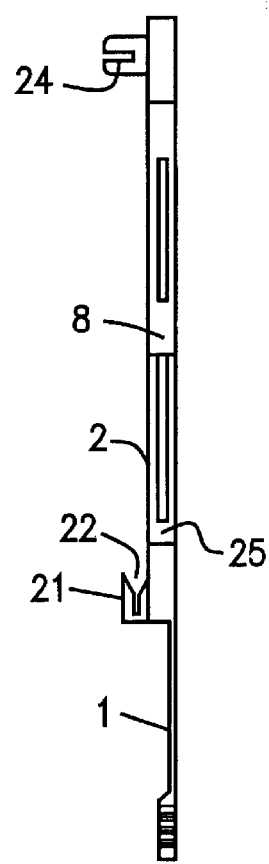

An additional embodiment is reproduced in FIGS. 4 and 5. I this case the contacts do not constitute an integral part of the upper housing part, but are instead fastened to the circuit board independently of it, for which reason the housing has an appropriately enlarged window 23, which encloses the contact support with play on all sides after assembly. In the case of this embodiment, the upper part 2 is provided, instead of the stops 5 simultaneously serving as fastening eyelets, with stops 25 at its front end for fastening to the circuit board and with separate hooks 21 permitting the surrounding of the circuit board and in their vicinity with elastic elements 22, as well as with spreader clips 24 at its back end which can be inserted into an opening of the circuit board. Assembly of the Chip card reading is extraordinarily simplified in this manner insofar as all that is necessary is the suspension of the hooks 21 on the edge of the circuit board and clipping the spreader clips 24 into the holes provided for this purpose in the circuit board, the elastic elements 22 holding the Chip card reading under tension, and thus in a stable position independently of the different thicknesses of circuit boards and of any manufacturing tolerances. If necessary, an additional protection against unintended release of the connection can be provided by axial tightening of a screw, thus spreading open the clip in the manner of a straddling dowel, by which the clip is held irremovable in place in its hole.

Finally, the upper part 2 is provided with a recess 26, whose edge 27 lying in the slide direction has a conically pointed form. Such recesses in the form of a window or a trough-like depression are frequently employed for purposes of materials saving or for creating an opening, in order to permit access to the circuit or assembly board underneath. They can cause difficulties in the sense that the chip card, frequently deformed after prolonged use, strikes the front edge of the recess, and thus an introduction into the read position is no longer possible or at least made more difficult. Due to the conically pointed form of the recess, on which the card slides while being pushed in, an unhindered introduction is guaranteed even in case of a severe deformation.

What is claimed is:

1. An apparatus for reading a chip card having a plurality of contact fields defined thereon, said apparatus having a two-part housing comprising a lower part (1) and an upper part (2) defining a card insertion slot therebetween, wherein said upper part (2) is attachable to a circuit board and includes a contact support (3) having a plurality of contact pairs (4) therein corresponding to said plurality of contact fields on said chip card; and wherein said lower part (1) is constructed as a slide that permits introduction of said chip card into said apparatus part (1) and includes a catch tab (9) engageable with each of a pair of corresponding spaced apart catches (10, 11) formed in said upper part (2) such that said lower part (1) is guided on said upper part (2) so as to engage said upper part between an outer limit position corresponding to a loading position and an inner limit position corresponding to a read position for said chip card.

2. The chip card reading apparatus of claim 1 further comprising a guide rail (7) in combination with a carriage (8) that is displaceable thereon.

3. The chip card reading apparatus of claim 2 wherein said guide rail (7) is formed laterally on either side of upper part (2).

4. The chip card reading apparatus of claim 3 wherein said carriage (8) is formed of grooved bars arranged on said lower part (1) surrounding said guide rail (7) and provided in a middle area with a window forming elastic ridges on which said catch tab (9) is formed.

5. The chip card reading apparatus of claim 3 wherein said carriage (8) is pivoted out elastically over a part of its length to define an elastically pivotable area (12).

6. The chip card reading apparatus of claim 5 wherein said elastically pivotable area (12) includes said catch tab (9) engageable with each of said corresponding catches (10, 11) formed in said upper part (2) and corresponding to an end position of said carriage (8).

7. The chip card reading apparatus of claim 6 wherein said upper part (2) is provided with at least one additional catch tab defining corresponding intermediate positions for engagement of said catch (9).

8. The chip card reading apparatus of claim 6 wherein said upper part (2) is flexible about a line extending parallel to said guide rail (7).

9. The chip card reading apparatus of claim 6 wherein said upper part is provided with stops (5) which prevent displacement of said carriage past predetermined rest positions (9, 10) and (9, 11).

10. The chip card reading apparatus of claim 9 wherein said stops (5) are provided with drilled holes that permit attachment of said upper part (2) to said circuit board.

11. The chip card reading apparatus of claim 1 wherein said lower part (1) includes an actuation element (19) projecting into a chip card insertion plane, said actuation element being movable outwards in a direction opposite said insertion plane upon insertion of said chip card in said lower part (1) and said actuation element (19) actuating a limit switch (20) upon sliding of said lower part (1) without a chip card.

12. The chip card reading apparatus of claim 11 wherein said actuation element (19) is integrally formed of a tearout of said lower part that is elastically pivotable outward from said insertion plane.

13. The chip card reading apparatus of claim 1 wherein said upper part (2) is provided at one of its edges with at least one hook (21) which encompasses a support and having elastic elements (22) proximate thereto in combination with spreader clips (24) wherein said spreader clips (24) are insertable in a corresponding opening in said support.

14. The chip card reading apparatus of claim 1 wherein said upper part (2) includes a window and corresponding recess having a conically pointed form.

* * * * *